(12) United States Patent
Kaibe et al.

(10) Patent No.: US 10,563,741 B2
(45) Date of Patent: Feb. 18, 2020

(54) BALL SCREW

(71) Applicant: Kuroda Precision Industries Ltd., Kanagawa (JP)

(72) Inventors: Ryo Kaibe, Kimitsu (JP); Hitoshi Hakogi, Ichihara (JP); Yoshimi Iwasaki, Kisarazu (JP); Tatsuto Omori, Asahi (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 0 days.

(21) Appl. No.: 16/211,860

(22) Filed: Dec. 6, 2018

(65) Prior Publication Data
US 2019/0195325 A1   Jun. 27, 2019

(30) Foreign Application Priority Data

Dec. 25, 2017   (JP) .................................. 2017-247534

(51) Int. Cl.
*F16H 1/24*        (2006.01)
*F16H 55/02*       (2006.01)
*F16H 25/22*       (2006.01)

(52) U.S. Cl.
CPC ................. *F16H 25/2219* (2013.01)

(58) Field of Classification Search
CPC .................................................. F16H 25/2219
See application file for complete search history.

(56) References Cited

U.S. PATENT DOCUMENTS

| 7,487,692 | B2 * | 2/2009 | Lin ..................... F16H 25/2223 |
| | | | 74/424.81 |
| 8,261,627 | B2 | 9/2012 | Miyahara et al. |
| 2008/0190231 | A1 * | 8/2008 | Chiu .................. F16H 25/2219 |
| | | | 74/424.86 |

FOREIGN PATENT DOCUMENTS

| FR | 1398059 A | * 5/1965 | ......... F16H 25/2219 |
| JP | 2003269565 | 9/2003 | |
| JP | 2007024305 | 2/2007 | |
| JP | 2013174316 | 9/2013 | |
| JP | 2014016039 | 1/2014 | |
| JP | 2014077459 | 5/2014 | |
| WO | WO2009057424 | 5/2009 | |

* cited by examiner

*Primary Examiner* — Jake Cook
(74) *Attorney, Agent, or Firm* — Dority & Manning, P.A.

(57) ABSTRACT

To prevent the positional precision of the ball return passage and the tongue of the end deflector relative to the nut main body from being impaired by an axial force applied by a screw used for securing the end deflector to the nut main body, the end deflector includes a flange (32) provided at an axial end of a main part (30) of the end deflector and provided with an axial through hole (50) for receiving a screw which is threaded into the nut main body, and a rib (52) projecting from a radially inner edge of the flange to an inner side of the deflector receiving recess (26).

6 Claims, 14 Drawing Sheets

BALL SCREW

TECHNICAL FIELD

The present invention relates to a ball screw, and in particular to a ball screw including a nut formed by securing an end deflector to a nut main body.

BACKGROUND ART

A known ball screw that can be used as a part of a linear drive mechanism comprises a screw shaft having an outer circumferential surface formed with a shaft thread, a nut main body having an inner circumferential surface formed with a nut thread opposite to the shaft thread to define a rolling passage in cooperation with the shaft thread, a ball return passage extending in an axial direction, and a deflector receiving recess formed on at least one end surface of the nut main body in continuation with the nut thread and defining an open end of the ball return passage, a plurality of balls received in the rolling passage and the ball return passage, and an end deflector received in the deflector receiving recess, the end deflector being provided with a ball passing passage for passing the balls between the rolling passage and the ball return passage, and a tongue guiding the balls from the rolling passage to the ball passing passage. The end deflector is fixedly secured to the nut main body by means of screws passed axially through the end deflector and threaded into the nut main body. See JP2007-24305A and JP2013-174316A, for instance.

In such a conventional ball screw, since the axial force caused by the fastening of the screws acts on the axial front end surface of the end deflector and the bottom surface of the deflector receiving recess upon which the front end surface of the end deflector abuts, and the fastening force of the screws is applied to the entire axial length of the end deflector as a compressive force, the end deflector is caused to deform over an wide region thereof, and this in turn may impair the positional precision of the ball passing passage and the tongue relative to the nut main body. Such an impairment of the positional precision may adversely affect the smooth operation of the ball screw.

This problem is particularly acute when the end deflector is made of plastic material, and is more prone to deformation than a deflector made of metallic material.

SUMMARY OF THE INVENTION

In view of such a problem of the prior art, a primary object of the present invention is to provide a ball screw in which the positional precision of the ball return passage and the tongue of an end deflector relative to a nut main body is prevented from being impaired by an axial force applied by screws used for securing the end deflector to the nut main body.

To achieve such an object, the present invention provides a ball screw, comprising: a screw shaft (12) having an outer circumferential surface formed with a shaft thread; a nut main body (14) having an inner circumferential surface formed with a nut thread opposite to the shaft thread defining a rolling passage (20) in cooperation with the shaft thread, a ball return passage (24) extending in an axial direction, and a deflector receiving recess (26) formed on at least one end surface of the nut main body in continuation with the nut thread and defining an open end of the ball return passage; a plurality of balls (28) received in the rolling passage and the ball return passage; and an end deflector (16) received in the deflector receiving recess; wherein the end deflector includes a main part (30) provided with a ball passing passage (36) for passing the balls between the rolling passage and the ball return passage, and a tongue (38) guiding the balls from the rolling passage to the ball passing passage, a flange (32) provided at an axial end of the main part and provided with an axial through hole (50) for receiving a screw (60) which is threaded into the nut main body to secure the end deflector to the nut main body, and a rib (52) projecting from a radially inner edge of the flange to an inner side of the deflector receiving recess.

Thereby, the fastening force of the screw (axial force) is supported by the flange, and the bending stiffness of the flange is reinforced by the rib, the deformation of the entire end deflector including the flange is reduced so that the impairment of the positional precision of the ball return passage and the tongue with respect to the nut main body can be minimized. The rib extends from the flange inward of the deflector receiving recess so that the axial length of the nut is not required to be increased.

The end deflector may be made of a molded plastic, member or a metallic member such as a metallic cast member.

Preferably, in this ball screw, the main part includes a pair of projecting pieces (42, 44) extending from either side of the tongue with respect to the axial direction in a circumferential direction of the nut main body, the projecting pieces defining a ball guide groove (40) extending between the ball passing passage (36) and the rolling passage (20) in cooperation with an inner circumferential surface of the deflector receiving recess, and one of the projecting pieces (42) located on a side of the flange is integrally formed with the flange.

Thereby, either one of the flange and the projecting piece serves as a reinforcing rib for the other so that the bending stiffness of these two parts can be improved.

Preferably, in this ball screw, the flange includes a radial flange part (46) extending from the axial end of the main part in a radially outward direction, and including a part integral with the one projecting piece (42), and a circumferential flange part (48) extending from the axial end of the main part in a circumferential direction opposite to a projecting direction of the projecting pieces.

Thereby, either one of the radial flange part and the projecting piece serves as a reinforcing rib for the other so that the bending stiffness of these two parts can be improved.

Preferably, in this ball screw, the flange (32) is provided with an annular configuration extending in a plane orthogonal to the axial direction, and the rib extends along an inner periphery of the flange so as to form a closed loop in cooperation with the main part.

Thereby, the reinforcing effect of the rib on the bending stiffness of the flange is particularly pronounced, and the bending stiffness of the main part is also increased with the result that the impairment of the positional precision of the ball return passage and the tongue relative to the nut main body can be avoided.

Preferably, in this ball screw, the rib includes a part radially overlapping with and making a surface contact with the inner circumferential surface of the nut main body.

Thereby, the bending stiffness of the flange is further improved so that the impairment of the positional precision of the ball return passage and the tongue relative to the nut main body can be avoided in a particularly effective manner.

Preferably, in this ball screw, the nut main body is provided with a recess (62) configured to receive the rib (52).

Thereby, the outer diameter of the nut is prevented from being increased owing to the presence of the rib.

According to the ball screw of the present invention, the positional precision of the ball return passage and the tongue of the end deflector relative to the nut main body is prevented from being impaired by an axial force applied by a screw used for securing the end deflector to the nut main body.

BRIEF DESCRIPTION OF THE DRAWING(S)

DESCRIPTION OF THE PREFERRED EMBODIMENT(S)

A ball screw according to a first embodiment of the present invention is described in the following with reference to FIGS. 1 to 8.

Figure 1:
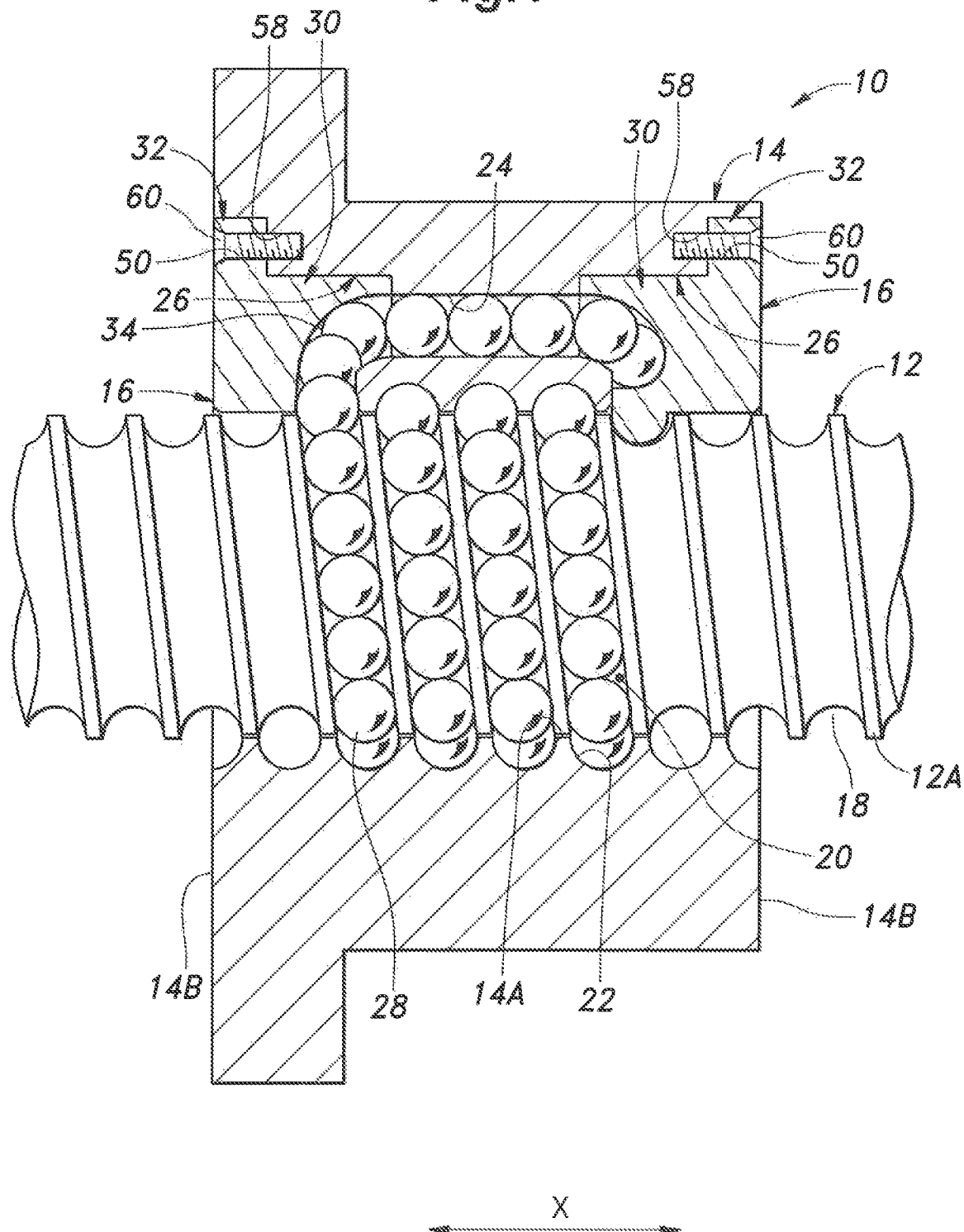
FIG. 1 is a vertical sectional view of a ball screw according to a first embodiment of the present invention.
Figure 2:
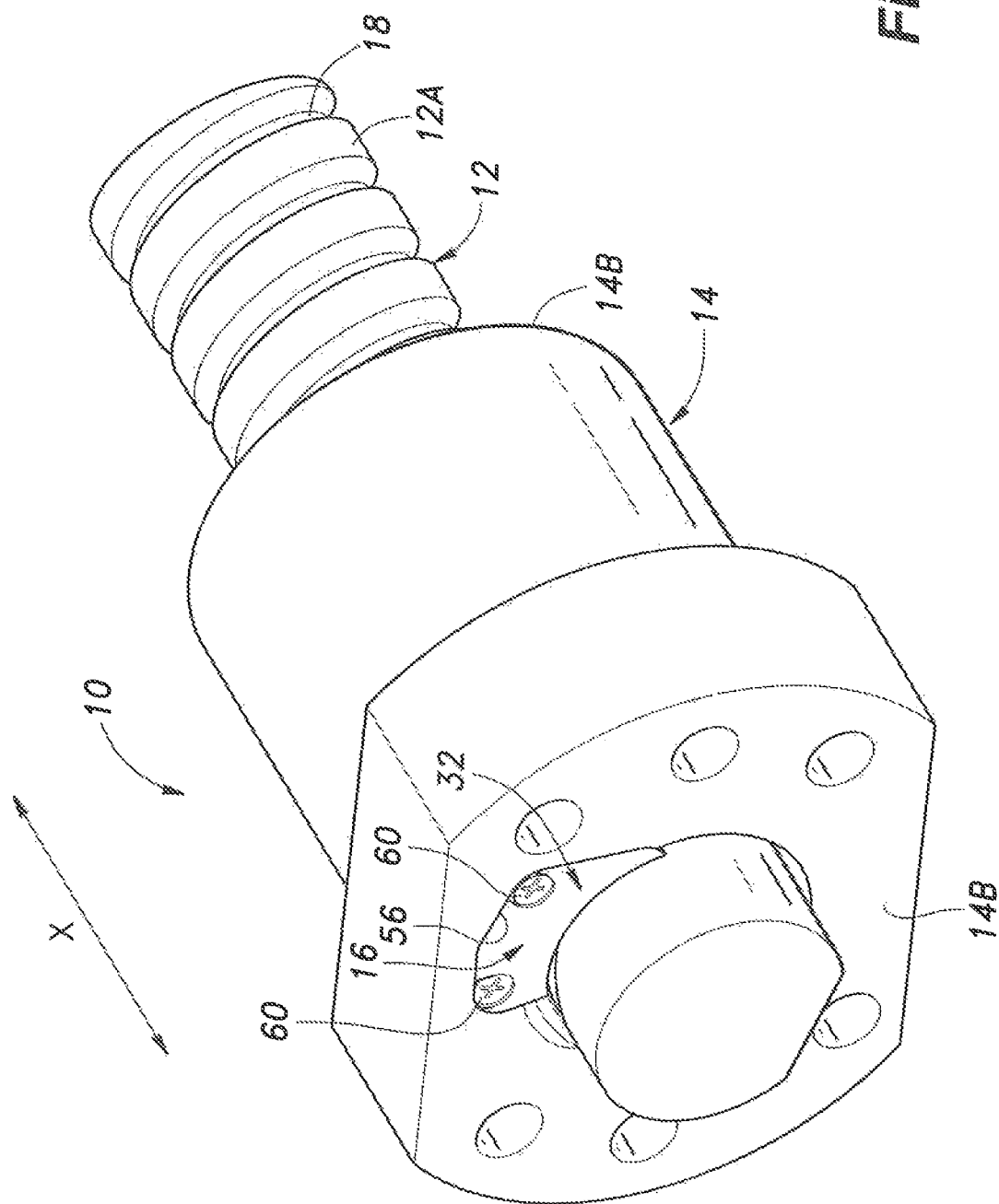
FIG. 2 is a perspective view of the ball screw.

As shown in FIG. 1, the ball screw 10 of the first embodiment includes a screw shaft 12, a nut main body 14, and a pair of end deflectors 16.

The direction of the central axial line of the ball screw is defined as the axial direction X which extends laterally in FIG. 1. The circumferential direction as used in this disclosure is a direction centered around the central axial line of the ball screw 10.

The screw shaft 12 consists of a metallic rod having a circular cross section, and has an outer circumferential surface formed with a shaft thread 18 thereon.

The nut main body 14 is formed of a cylindrical metallic member, and is provided with an inner circumferential surface 14A formed with a nut thread 22 opposite to the shaft thread 18 of the screw shaft 12 so as to define a rolling passage 20 in cooperation with the shaft thread 18, a ball return passage 24 extending in the cylindrical wall of the nut main body 14 in the axial direction X, and a pair of end surfaces 14B located on either axial end (axial direction X) of the nut main body 14 and each defining a deflector receiving recess 26. An end deflector 16 is received in each deflector receiving recess 26.

A plurality of metallic balls 28 are received in the rolling passage 20 and the ball return passage 24 so as to roll therein.

The end deflector 16, the deflector receiving recess 26, and the mounting structure for the end deflector 16 are described in the following with reference to FIGS. 2 to 8.

Each end deflector 16 consists of a molded plastic member made of such a plastic material as polyacetal (POM), polyetheretherketone (PEEK), polyphenylene sulfide (PPS), polyamide (PA) and so on, and includes a main part 30, and a flange 32 provided on one end thereof with respect to the axial direction X (this end may be referred to as an outer end).

The main part 30 is provided with a ball guide groove 34 which is curved so as to include an axial section 34A and a circumferential section 34B, and defines a ball passing passage 36 (see FIG. 3) having a closed cross section in cooperation with an inner circumferential surface 54B (which will be described hereinafter) of the deflector receiving recess 26, a tongue 38 extending in the circumferential direction from a tip end of the circumferential section 34B of the ball guide groove 34, and bulging radially inward so as to advance into a corresponding part of the shaft thread 18, and a pair of projecting pieces 42 and 44 extending from either side (spaced away from each other in the axial direction X) of the tongue 38 in the circumferential direction of the nut main body 14 substantially parallel to each other.

The projecting pieces 42 and 44 are formed as individual cantilevers having base ends on the side of the tongue 38 and spaced from each other in the axial direction X, and define a ball guide groove 40 (see FIG. 3) continuing to the ball guide groove 34 in cooperation with an inner circumferential surface 54B of the deflector receiving recess 26. The ball guide groove 40 extends between the ball passing passage 36 and the rolling passage 20, and provides an extension of the rolling passage 20 in cooperation with the shaft thread 18 that passes the balls 28 between the ball passing passage 36 and the rolling passage 20. The tongue 38 is configured to scoop up the balls 28 from the ball guide groove 40 to guide the balls 28 to the ball passing passage 36.

The ball guide groove 40 provides a passage for the balls 28 in cooperation with the corresponding part of the shaft thread 18 of the screw shaft 12, and this passage connects the rolling passage 20 and the ball passing passage 36 to each other. The projecting pieces 42 and 44 are provided with inner circumferential surfaces 42A and 43A, respectively, consisting of arcuate surfaces extending in the circumferential direction so as to avoid interfering with the screw shaft 12.

The flange 32 serves as an attachment piece for the end deflector 16 with respect to the nut main body 14, and extends radially outward and circumferentially from an axially outer end of the main part 30 so as to define a complete annular end surface jointly with the end surface 14B of the nut main body 14.

More specifically, the flange 32 includes a radial flange part 46 extending radially outwardly from the outer end of the main part 30 and having one of the projecting pieces 42 (the outer projecting piece 42) as an integral part thereof, and a circumferential flange part 48 extending circumferentially from a side of the radial flange part 46 facing away from the projecting piece 42. The radial flange part 46 and the circumferential flange part 48 are each provided with a through hole 50 extending in the axial direction X. The circumferential flange part 48 is provided with an inner circumferential surface 48A consisting of a circumferential arcuate surface continuing from the inner circumferential surface 42A of the projecting piece 42 so as to avoid interfering with the screw shaft 12.

The radial flange part 46 serves as a reinforcing rib for reinforcing the bending stiffness of the circumferentially extending projecting piece 42 while serving also as a part of the mounting piece for the end deflector 16. It can be also said that the projecting piece 42 serves as a reinforcing rib for reinforcing the bending stiffness of the radial flange part 46 by being formed on the radially inward side of the radial flange part 46. Thus, the radial flange part 46 and the projecting piece 42 serve as reinforcing ribs for mutually reinforcing the bending stiffness.

The end deflector 16 is integrally provided with a rib 52 that projects inward in the axial direction X from the radially inner edge of the circumferential flange part 48 and extends along an inner circumferential surface 48A of the circumferential flange part 48.

Figure 3:
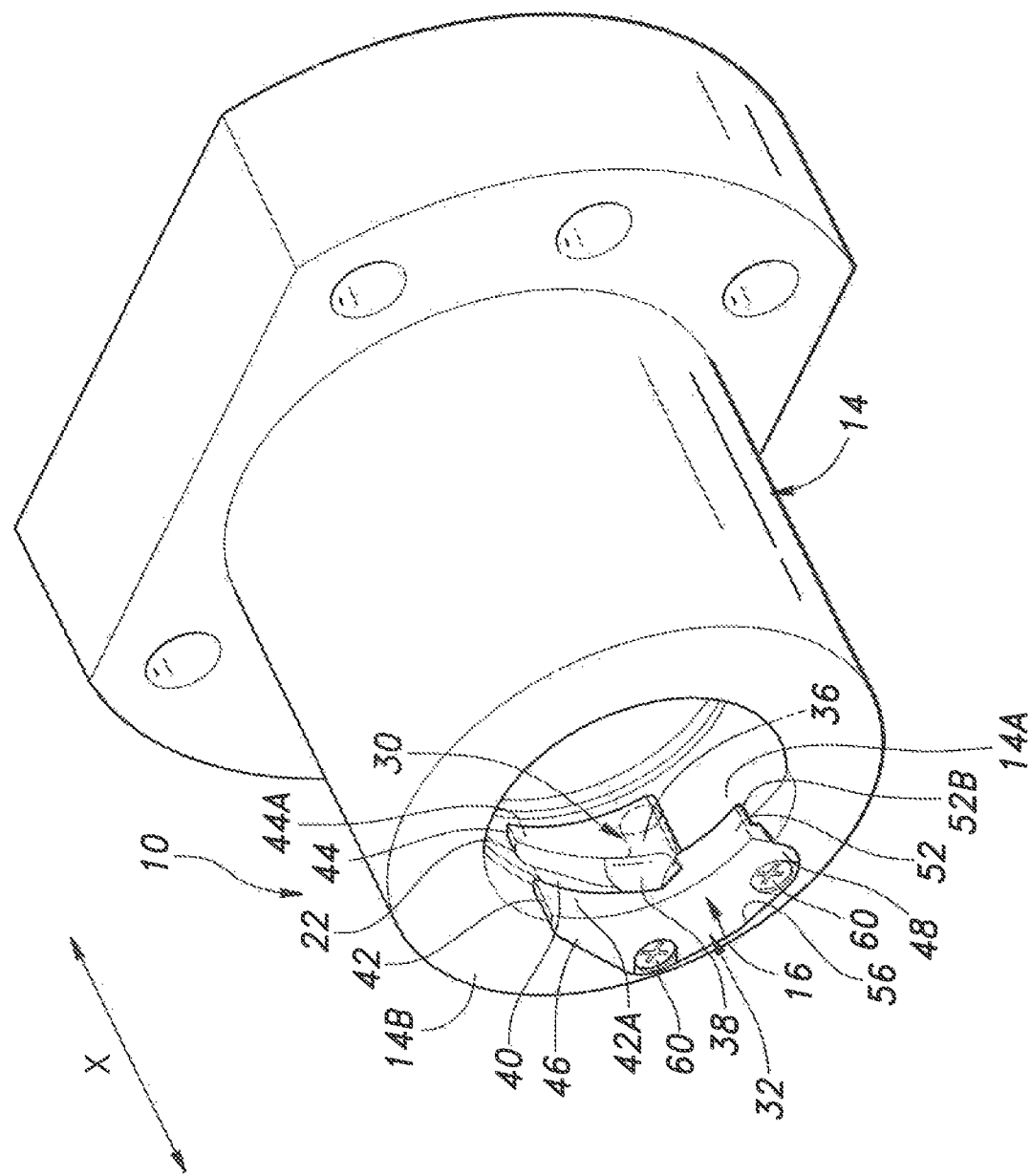
FIG. 3 is a perspective view of the ball screw with a screw rod omitted therefrom.
Figure 4:
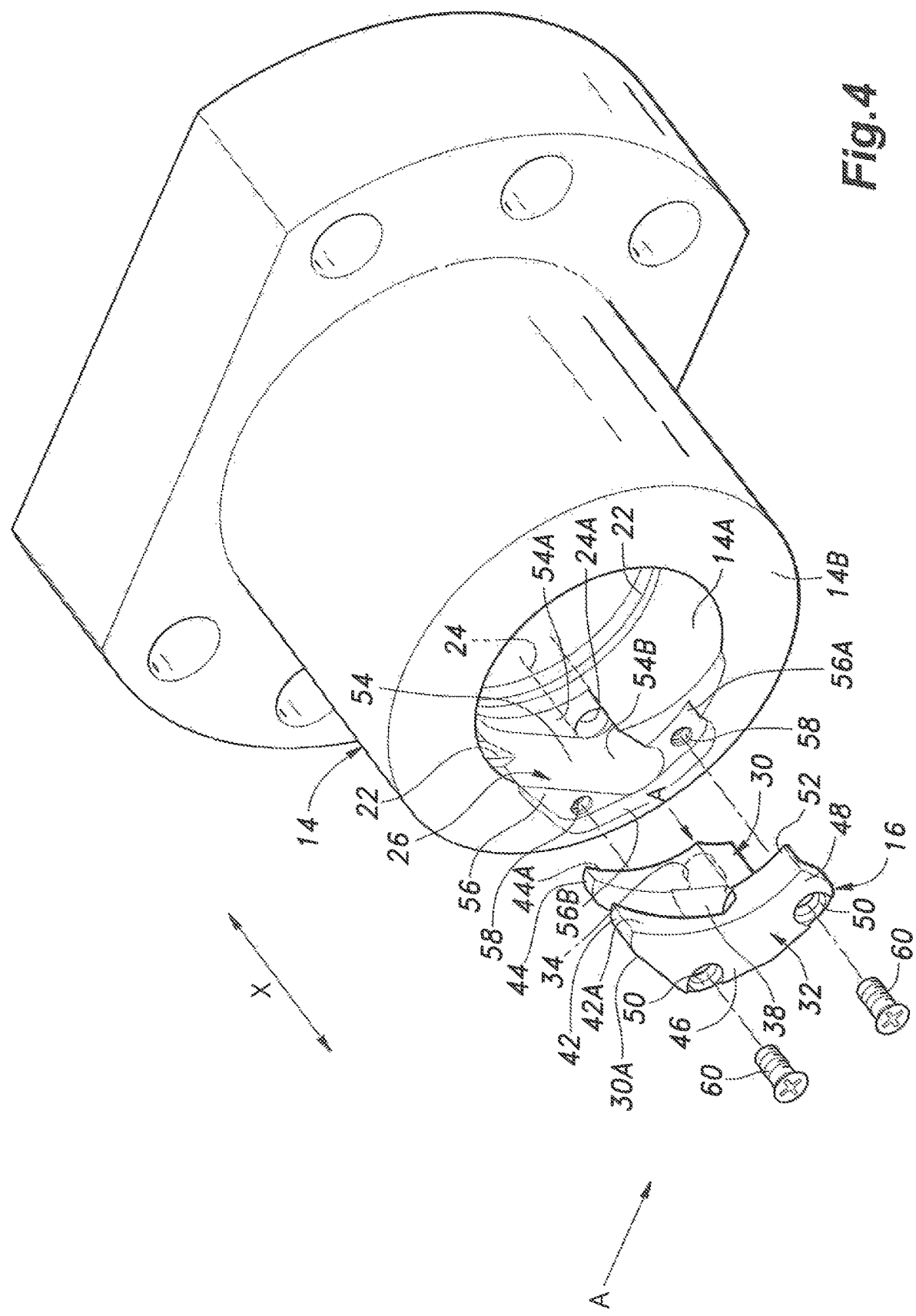
FIG. 4 is an exploded perspective view of the ball screw with the screw rod omitted therefrom.
Figure 5:
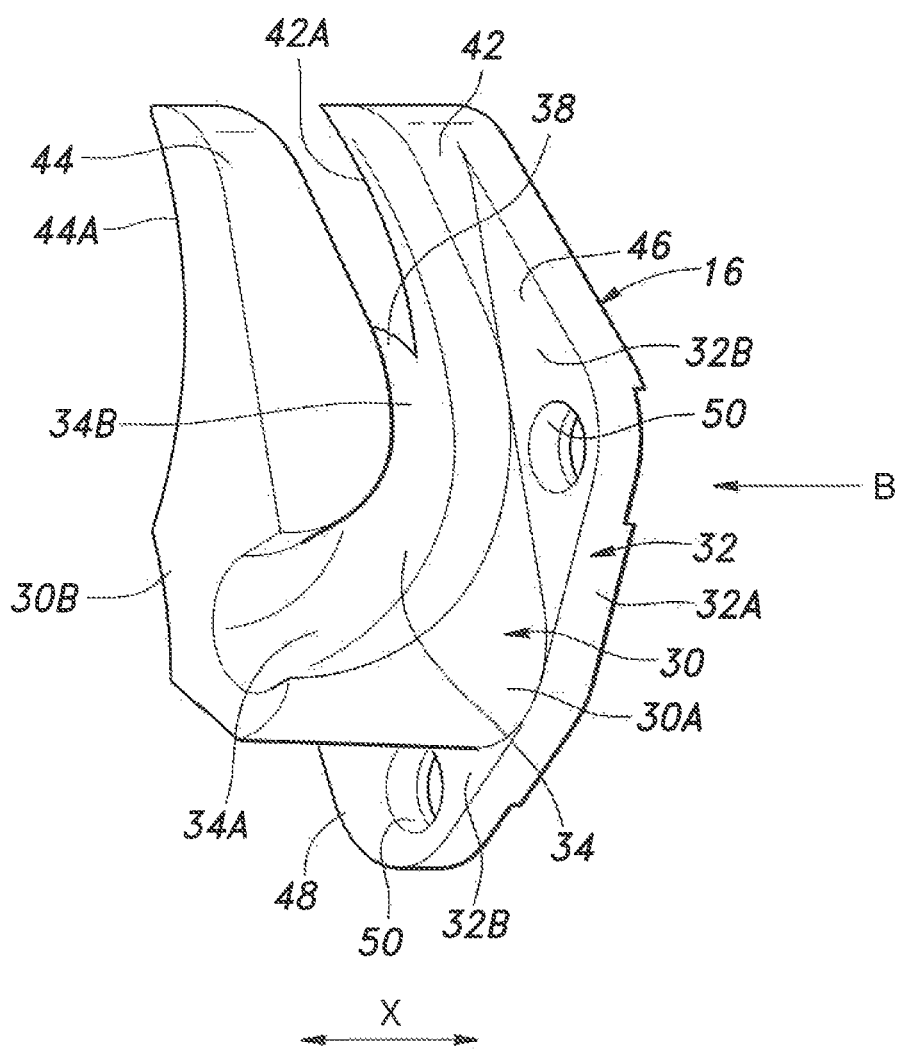
FIG. 5 is an enlarged perspective view of an end deflector of the ball screw as seen in the direction indicated by A in FIG. 4.
Figure 6:
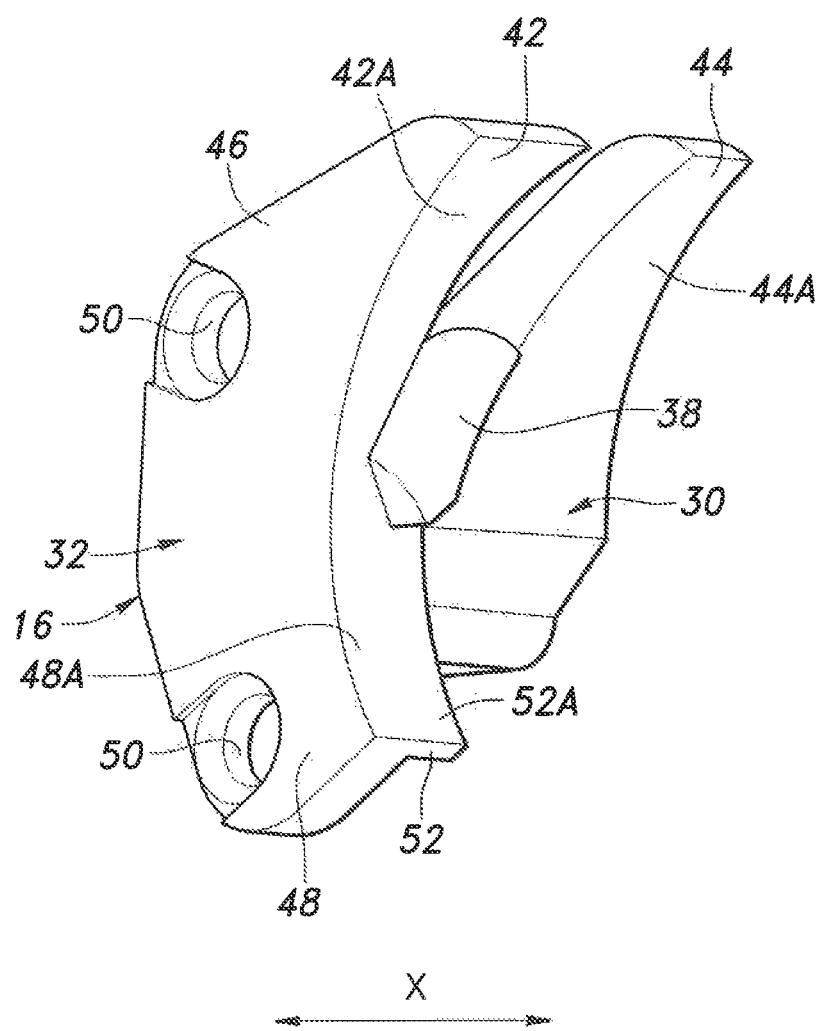
FIG. 6 is an enlarged perspective view of the end deflector of the ball screw as seen in the direction indicated by B in FIG. 5.
Figure 7:
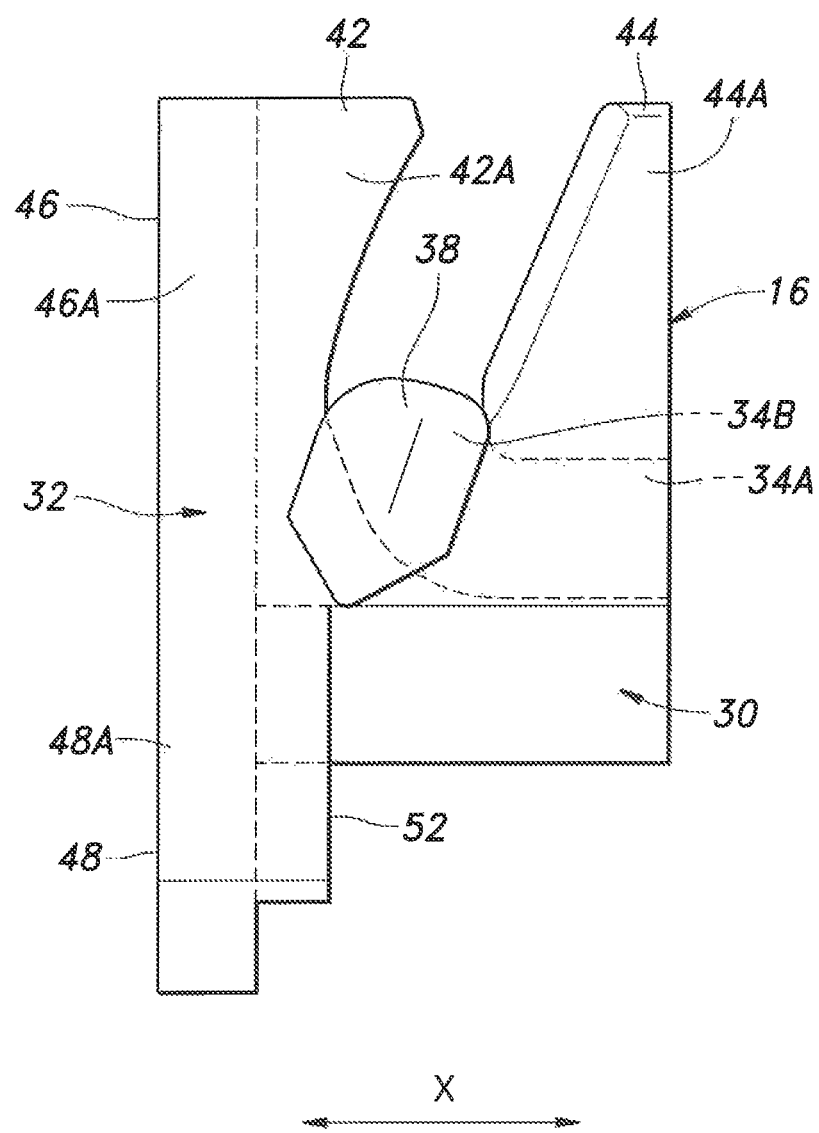
FIG. 7 is a left side view of the end deflector of the ball screw.
Figure 8:
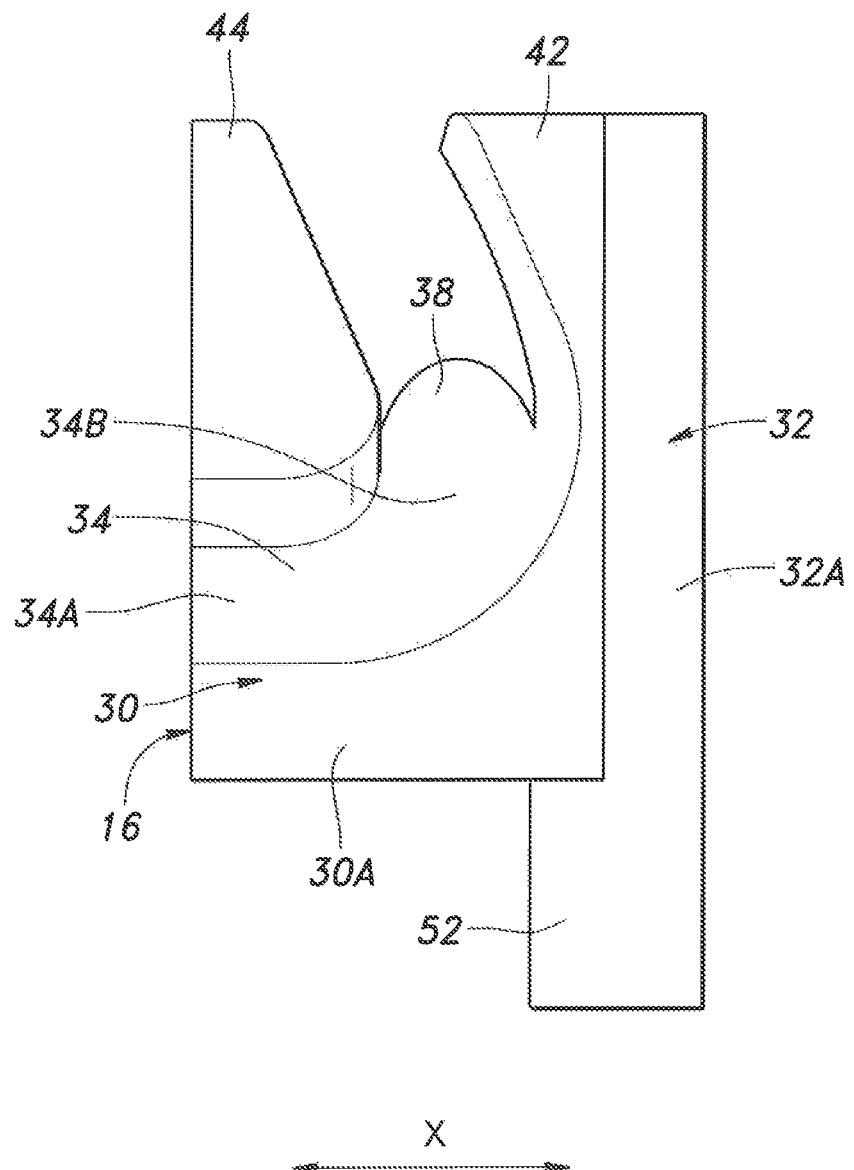
FIG. 8 is a right side view of the end deflector of the ball screw.
Figure 9:
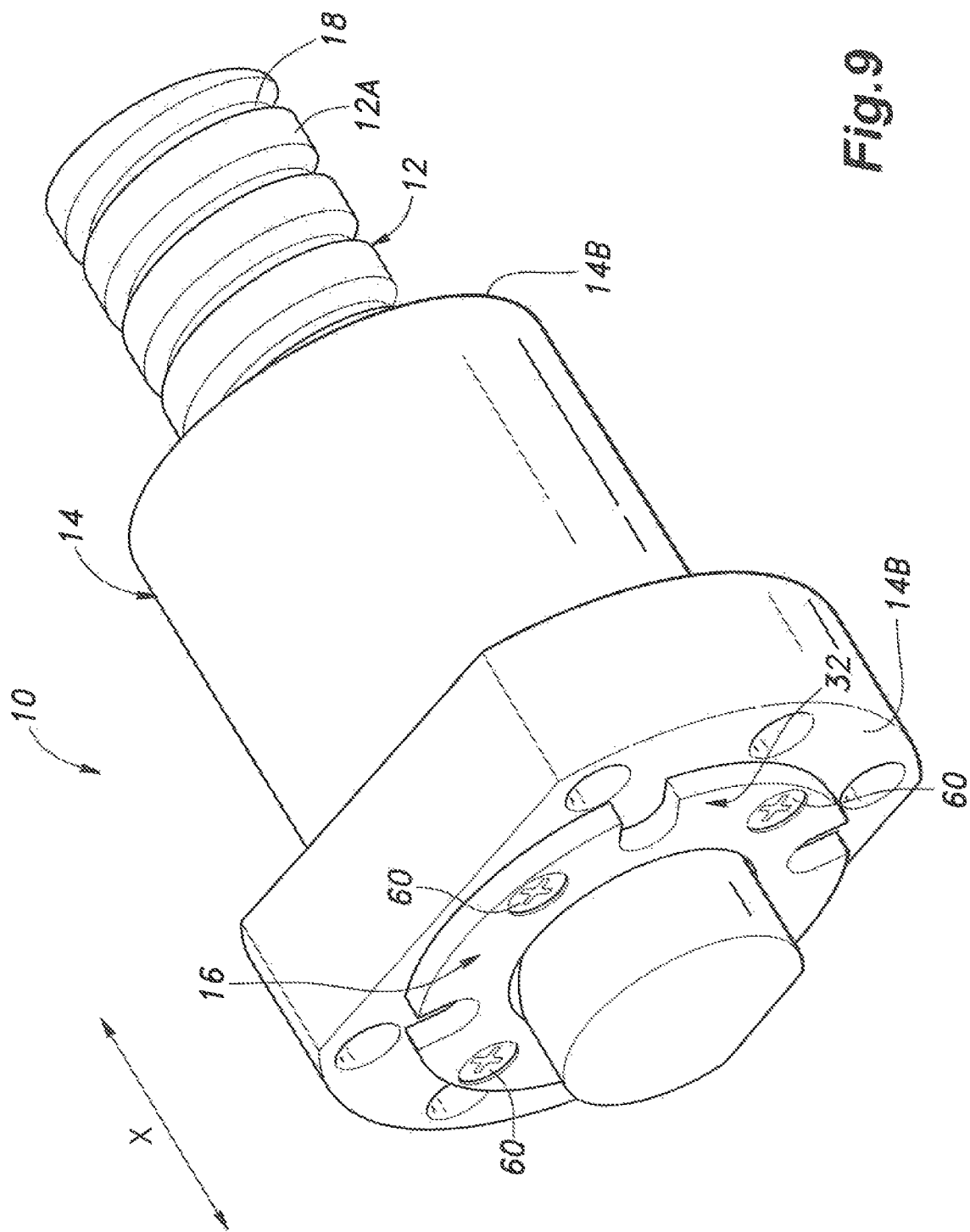
FIG. 9 is a perspective view of a ball screw according to a second embodiment of the present invention.
Figure 10:
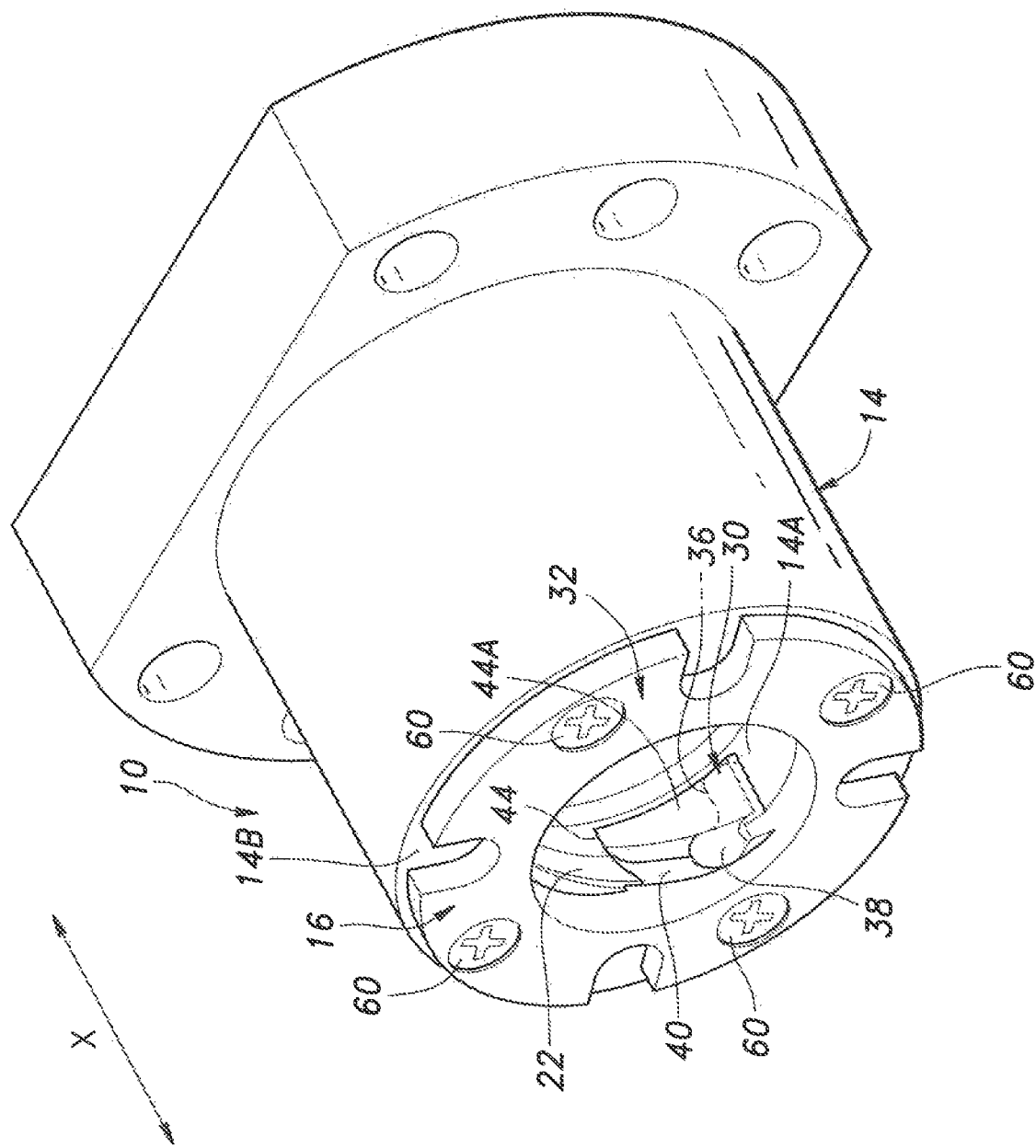
FIG. 10 is a perspective view of the ball screw with a screw rod omitted therefrom.
Figure 11:
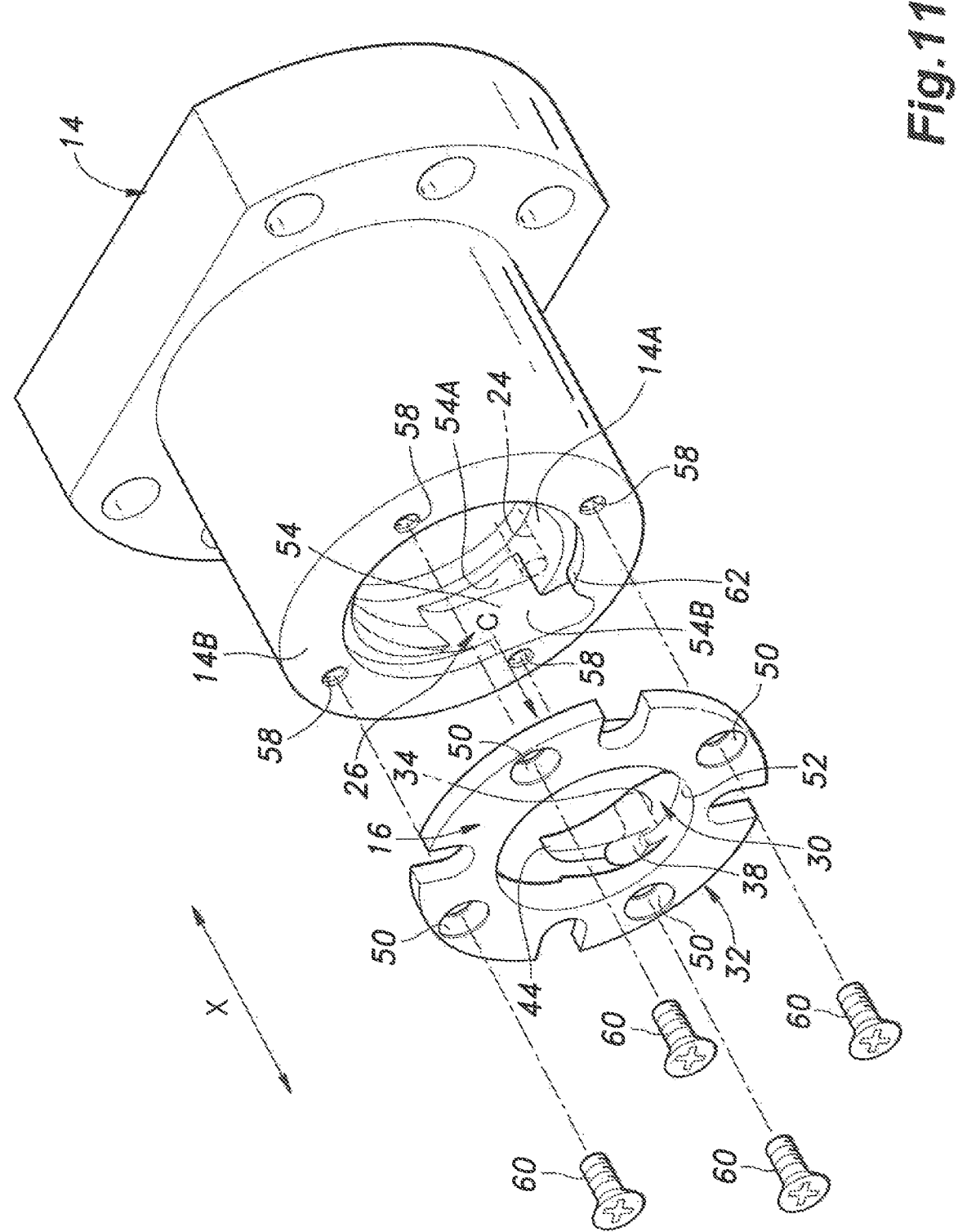
FIG. 11 is an exploded perspective view of the ball screw with the screw rod omitted therefrom.
Figure 12:
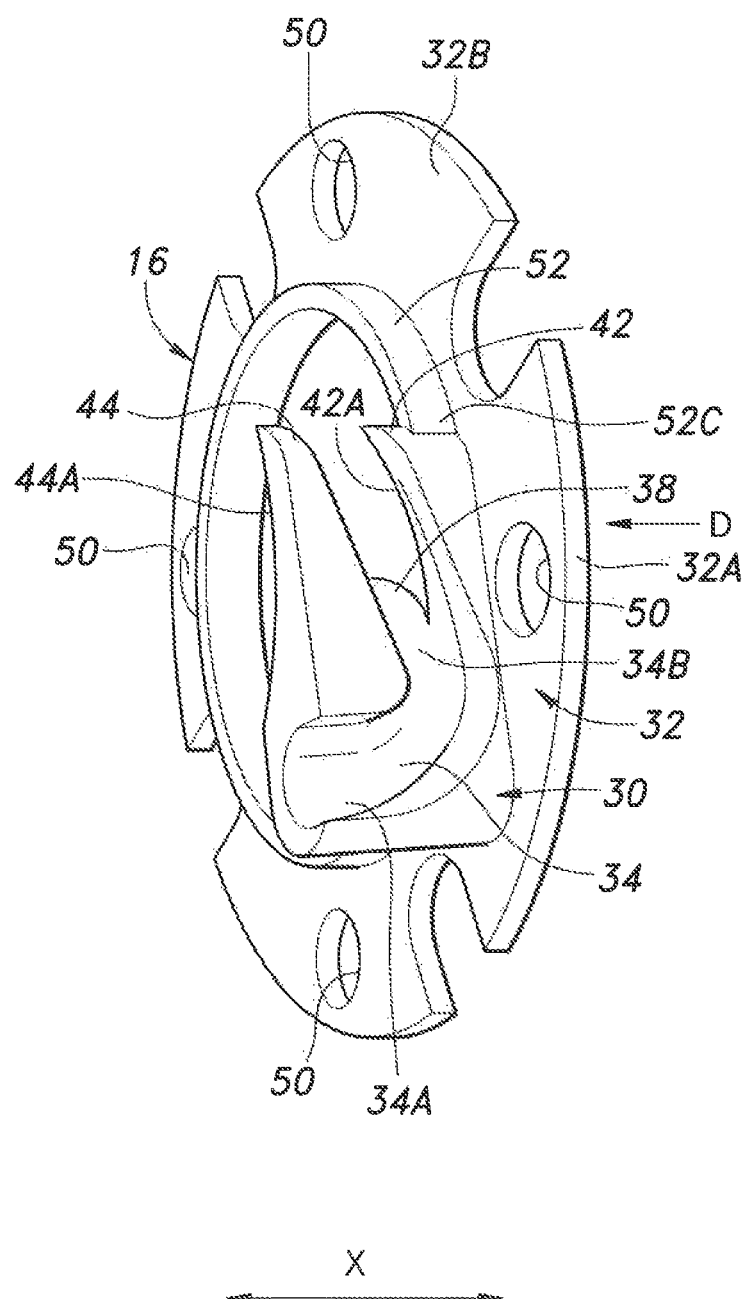
FIG. 12 is an enlarged perspective view of an end deflector of the ball screw as seen in the direction indicated by C in FIG. 11.
Figure 13:
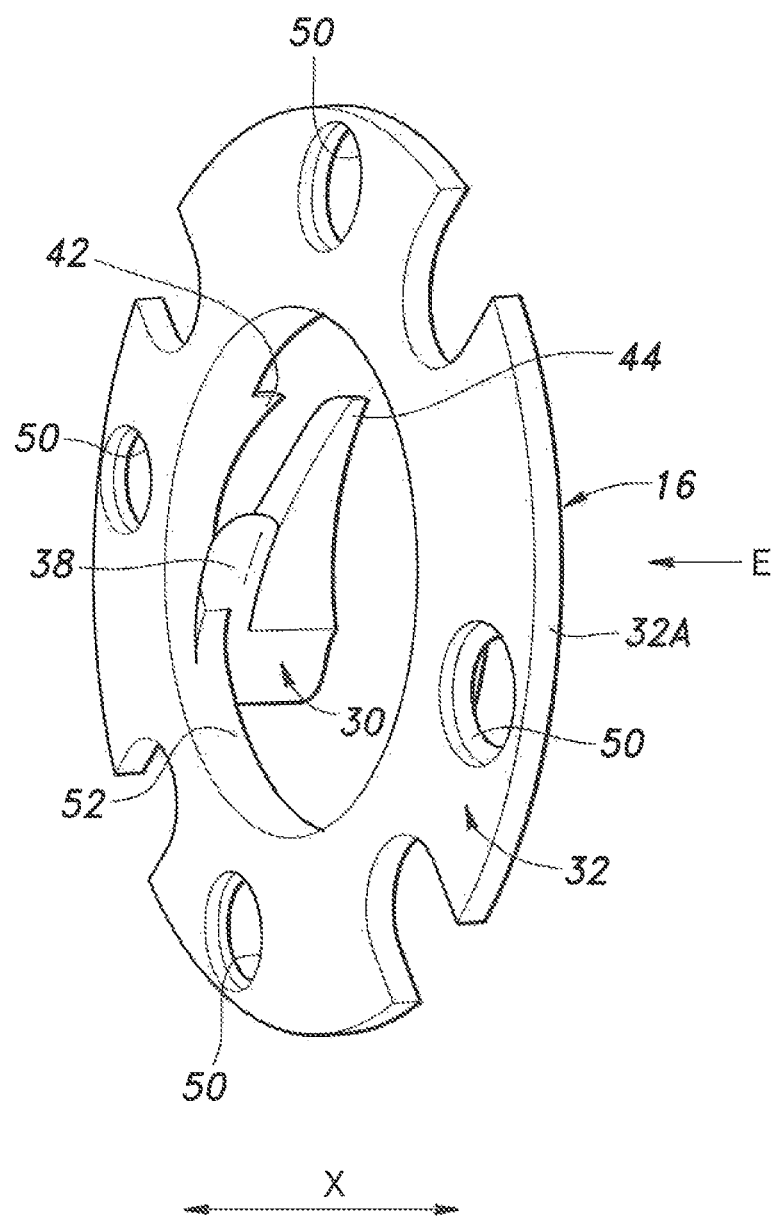
FIG. 13 is an enlarged perspective view of the end deflector of the ball screw as seen in the direction indicated by D in FIG. 12.
Figure 14:
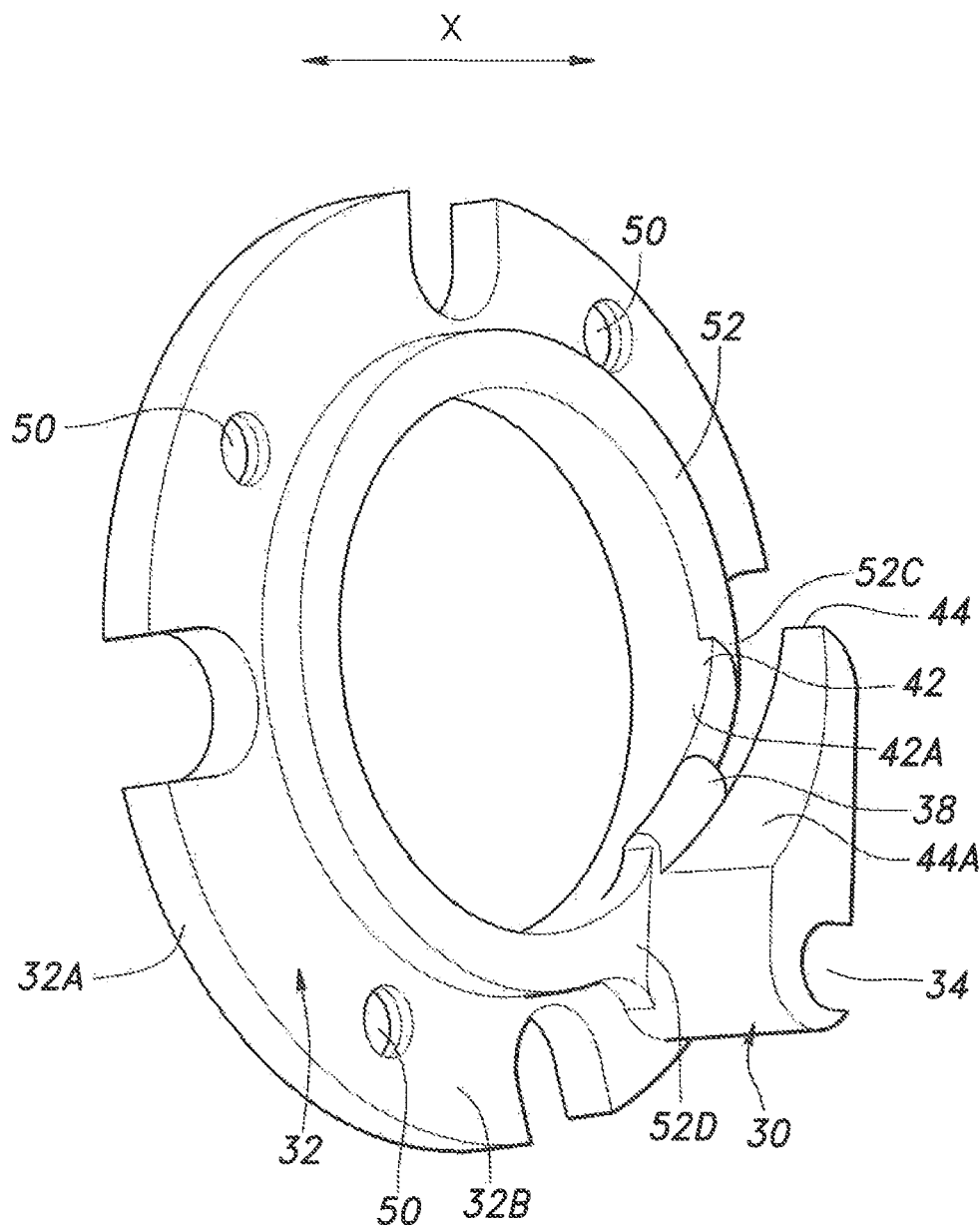
FIG. 14 is an enlarged perspective view of the end deflector of the ball screw as seen in the direction indicated by E in FIG. 13.

The rib 52 has the function to reinforce the bending stiffness of the circumferential flange part 48, and is connected to the main part 30 at a circumferential end part thereof, and defines an inner circumferential surface 52A flush and continuous with the inner circumferential surface 48A of the circumferential flange part 48 so as to avoid interfering with the screw shaft 12. As shown in FIG. 3, the rib 52 includes an overlapping portion 52B which lies over the inner circumferential surface 14A of the nut main body 14. In particular, the outer circumferential surface of the overlapping portion 52B is in surface contact with the inner circumferential surface 14A of the nut main body 14.

Each deflector receiving recess 26 includes a main part receiving portion 54 formed substantially conformally to the main part 30 to receive the main part 30 therein, and a flange receiving portion 56 located more outward than the main part receiving portion 54 in the axial direction X, and formed substantially conformally to the flange 32 to receive the flange 32 therein.

The main part receiving portion 54 is provided with a bottom surface 54A extending in a plane orthogonal to the axial direction X on an inner side with respect to the axial direction X (the interior side of the deflector holding recess 26). An axial end 24A (see FIG. 4) of the ball return passage 24 opens at the bottom surface 54A. The main part receiving portion 54 is provided with an inner circumferential surface 54B between the open end thereof adjacent to the flange receiving portion 56 and the bottom surface 54A, and this inner circumferential surface 54B is substantially conformal to the outer circumferential surface 30A defined on the radially outer side of the main part 30. A nut thread 22 reaches the inner circumferential surface 54B. More specifically, the terminal end of the nut thread 22 is located in the inner circumferential surface 54B.

The end deflector 16 is positioned relative to the nut main body 14 with respect to both the circumferential direction and the radial direction by fitting the main part 30 into the main part receiving portion 54 while the outer circumferential surface 30A of the main part 30 is in contact with the inner circumferential surface 54B of the main part receiving portion 54.

The flange receiving portion 56 is provided with a bottom surface 56A defining a plane which is orthogonal to the axial direction X on the inner side (interior side) thereof in the axial direction X. A pair of threaded holes 58 for screws 60 are formed in the bottom surface 56A at positions corresponding to the through holes 50. The flange receiving portion 56 is provided with an inner circumferential surface 56B substantially conformal to the outer circumferential surface 32A of the flange 32 on a radially outer part thereof located between the open end corresponding to the end surface 14B of the nut main body 14 and the bottom surface 56A thereof. The outer circumferential surface 32A of the flange 32 and the inner circumferential surface 56B of the flange receiving portion 56 are fitted with each other loosely enough not to interfere with the positioning of the end deflector 16 owing to the tight or snug fit between the main part 30 and the main part receiving portion 54.

Once the main part 30 of each end deflector 16 is inserted into the main part receiving portion 54, and the flange 32 is inserted into the flange receiving portion 56 as discussed above, screws 60 consisting of countersunk screws are passed through the respective through holes 50, and are threaded into the respective threaded holes 58. By fastening these screws 60, the end deflector 16 is fixedly secured to the nut main body 14.

In this way, by fixedly securing the end deflectors 16 to the nut main body 14, the terminal ends of the ball guide grooves 40 are connected to the corresponding ends of the nut thread 22, and the ball passing passage 36 is connected to the ball return passage 24 in each deflector 16.

Once fixedly secured in this manner, an inner end surface 32B of the flange 32 in the axial direction X is strongly pressed against a bottom surface 56A of the flange receiving portion 56 whereas the inner end surface 30B of the main part 30 in the axial direction X is lightly pressed against the bottom surface 54A of the part receiving portion 54 or may even do not come into contact with the bottom surface 54A.

Since the screws 60 penetrate the flange 32 of the end deflector 16 in the axial direction, and are threaded into the nut main body 14, the axial force applied to the flange 32 owing to the fastening of the screws 60 is transmitted to the end surface 32B of the flange 32 and the bottom surface 56A of the flange receiving portion 56 which abut upon each other in the axial direction, and does not substantially act on the main part 30.

As a result, the fastening force of the screws 60 acts only on the flange 32 so that the deformation of the end deflector 16 due to the tightening of the screws 60 is limited to the flange 32, and the main part 30 is prevented from deforming under the tightening force of the screws 60. As a result, the positional accuracy of the ball guide grooves 34 and 40, the tongue 38, the projecting pieces 42 and 44 relative to the nut main body 14 is ensured in spite of the fastening of the screws 60 so that smooth circulation of the balls 28 is ensured. This improves the operation performance of the ball screw 10 and the durability of the end deflectors 16.

Furthermore, each end deflector 16 is provided with the rib 52 on the circumferential flange part 48 so that the bending stiffness of the circumferential flange part 48 is improved. Further, since the projecting piece 42 acts as a reinforcing rib for the radial flange part 46, the bending stiffness of the radial flange part 46 is improved. As a result, deformation of the flange 32 due to the tightening of the screws 60 is minimized. This also minimizes the deterioration of the positional accuracy of the ball guide grooves 34 and 40, the tongue 38, the projecting pieces 42 and 44 with respect to the nut main body 14 in spite of the tightening of the screws 60 so that the smooth circulation of the balls 28 is ensured, and the operating performance of the ball screw 10 and the durability of the end deflectors 16 are improved.

Furthermore, since the rib 52 includes the overlapping portion 52B that overlaps with and radially opposes the inner circumferential surface 14A of the nut main body 14 in a close surface contact therewith, the bending stiffness of the circumferential flange part 48 is reinforced by the rib 52 in an effective manner so that the deformation of the circumferential flange part 48 is effectively minimized even further. This also contributes to the prevention of the impairment of the positional precision of the ball guide grooves 34 and 40, the tongue 38, and the projecting pieces 42 and 44 with respect to the nut main body 14 in spite of the tightening of the screws 60, so that the smooth circulation of the balls 28 is ensured, and the operating performance of the ball screw 10 and the durability of the end deflector 16 are improved.

Since the rib 52 extends inward in the axial direction X from the radially inner edge of the circumferential flange part 48, the rib 52 does not cause the axial length of the nut to be increased or the outer diameter of the nut to be increased.

A ball screw according to a second embodiment of the present invention is described in the following with reference to FIGS. 9 to 14. In FIGS. 9 to 14, parts corresponding to those in FIGS. 1 to 8 are denoted with like reference numerals, and such parts may be omitted in the following description.

In the second embodiment, the flange 32 of each end deflector 16 is provided with an annular shape that is concentric to the center of the nut main body 14 when viewed in the axial direction X, and extends substantially over the entire circumference thereof. The flange 32 has an inwardly directed end surface 32B that abuts a corresponding end surface 14B of the nut main body 14. The end surface 14B of the nut main body 14 is formed with a plurality (four) of threaded holes arranged at a regular interval along the circumferential direction. Corresponding through holes 50 are passed through the flange 32 in the axial direction.

The end deflector 16 is fixedly secured to the end surface 14B of the nut main body 14 by a plurality of screws 60 passed through the respective through holes 50, and threaded into the respective threaded holes 58.

Thus, in the second embodiment also, the fastening force of the screws 60 acts only on the flange 32, and the deformation of the end deflector 16 due to the tightening of the screws 60 is limited to the flange 32 so that the fastening force of the screws 60 is prevented from causing the deformation of the main part 30. As a result, the positional accuracy of the ball guide grooves 34 and 40, the tongue 38, and the projecting pieces 42 and 44 relative to the nut main body 14 can be ensured, and the smooth circulation of the balls 28 is ensured in spite of the fastening of the screws 60. This improves the operation performance of the ball screw 10 and the durability of the end deflector 16.

The rib 52 extends inward in the axial direction X from the substantially entire periphery of the radially inner edge of the flange 32 toward the inner side. More specifically, the rib 52 extends circumferentially from a first end 52C thereof which is connected to the free end of the projecting piece 42 to a second end 52D connected to the tongue 38 of the main part 30. In other words, the rib 52 forms a closed loop along the inner circumference of the flange 32 in cooperation with the main part 30.

Thereby, the rib 52 acts as a reinforcing rib for increasing the bending stiffness of the flange 32 jointly with the main part 30. Since the two circumferential ends of the rib 52 are joined to the main part 30 to form a closed loop in cooperation with the main part 30, the bending stiffness of the rib 52 itself is also increased so that the capability of the rib 52 to increase the bending stiffness of the flange 32 is further enhanced.

Thus, the deformation of the flange 32 is effectively minimized, and the impairment of the positional accuracy of the ball guide grooves 34 and 40, the tongue 38, and the projecting pieces 42 and 44 with respect to the nut main body 14 can be minimized. This ensures the smooth circulation of the balls 28 and improves the operation performance of the ball screw 10 and the durability of the end deflector 16.

Since the rib 52 projects inward from the radially inner edge of the circumferential flange part 48 in the axial direction it does not cause the axial length of the nut to be increased or the diameter of the nut to be increased.

The inner periphery of the end surface 14B of the nut main body 14 is provided with a substantially annular rib receiving recess 62 formed by enlarging the bore defined by the inner periphery of the end surface 14B so as to receive the rib 52 therein. By thus fitting the rib 52 into the rib receiving recess 62, the outer diameter of the nut is prevented from becoming large.

Although the present invention has been described in terms of preferred embodiments thereof, it can be modified and substituted without departing from the spirit of the present invention.

For example, the material of the end deflector 16 is not limited to resin, but may also be made of a metal such as a cast member. The ball screw 10 may be of a type having the end deflector 16 only on one end of the nut main body 14. The structure in which the nut main body 14 includes the rib receiving recess 62 for receiving the rib 52 of the end deflector 16 can be similarly applied to that of the first embodiment.

The components included in the foregoing embodiments are not necessarily essential for the present invention, and can be omitted as required without departing from the spirit of the present invention.

The invention claimed is:

1. A ball screw, comprising:
   a screw shaft having an outer circumferential surface formed with a shaft thread;
   a nut main body having an inner circumferential surface formed with a nut thread opposite to the shaft thread to define a rolling passage in cooperation with the shaft thread, a ball return passage extending in an axial direction of the screw shaft, and a deflector receiving recess formed on at least one end surface of the nut main body in continuation with the nut thread and defining an open end of the ball return passage;
   a plurality of balls received in the rolling passage and the ball return passage; and
   an end deflector received in the deflector receiving recess;
   wherein the end deflector includes
   a main part provided with a ball passing passage for passing the balls between the rolling passage and the ball return passage, and a tongue guiding the balls from the rolling passage to the ball passing passage,
   a flange provided at an axial end of the main part and provided with an axial through hole extending in the axial direction for receiving a screw which is threaded into the nut main body to secure the end deflector to the nut main body, and
   a rib projecting in an axial direction from a radially inner edge of the flange to an inner side of the deflector receiving recess.

2. The ball screw according claim 1, wherein the main part includes a pair of projecting pieces extending from either side of the tongue with respect to the axial direction in a circumferential direction of the nut main body, the projecting pieces defining a ball guide groove extending between the ball passing passage and the rolling passage in cooperation with an inner circumferential surface of the deflector receiving recess, and one of the projecting pieces located on a side of the flange is integrally formed with the flange.

3. The ball screw according claim 2, wherein the flange includes a radial flange part extending from the axial end of the main part in a radially outward direction, and including a part integral with the one projecting piece, and a circumferential flange part extending from the axial end of the main part in a circumferential direction opposite to a projecting direction of the projecting pieces.

4. The ball screw according claim 1, wherein the flange is provided with an annular configuration extending in a plane orthogonal to the axial direction, and the rib extends along an inner periphery of the flange so as to form a closed loop in cooperation with the main part.

5. The ball screw according claim 1, wherein the rib includes a part radially overlapping with and making a surface contact with the inner circumferential surface of the nut main body.

6. The ball screw according claim 1, wherein the nut main body is provided with a recess configured to receive the rib.

* * * * *